United States Patent
Okado (10) Patent No.: US 7,812,867 B2
(45) Date of Patent: Oct. 12, 2010

(54) IMAGE PROCESSING APPARATUS ADAPTED TO CORRECT IMAGE SIGNAL

(75) Inventor: Teruyuki Okado, Adachi-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 945 days.

(21) Appl. No.: 11/257,749

(22) Filed: Oct. 25, 2005

(65) Prior Publication Data

US 2006/0092477 A1 May 4, 2006

(30) Foreign Application Priority Data

Oct. 29, 2004 (JP) ............................ 2004-315841
Feb. 1, 2005 (JP) ............................ 2005-025212
Feb. 1, 2005 (JP) ............................ 2005-025213

(51) Int. Cl.
H04N 9/64 (2006.01)
H04N 5/235 (2006.01)

(52) U.S. Cl. ...................................... 348/247; 348/362

(58) Field of Classification Search ................. 348/246, 348/247, 222.1, 241, 243, 349, 362, 372
See application file for complete search history.

(56) References Cited

U.S. PATENT DOCUMENTS

| | | | |
|---|---|---|---|
| 5,144,446 A | | 9/1992 | Sudo et al. |
| 5,416,516 A * | | 5/1995 | Kameyama et al. .......... 348/246 |
| 6,002,433 A * | | 12/1999 | Watanabe et al. ........... 348/246 |
| 6,230,108 B1 * | | 5/2001 | Matsuda ....................... 702/99 |
| 6,275,260 B1 * | | 8/2001 | Anderson ..................... 348/239 |
| 6,396,539 B1 * | | 5/2002 | Heller et al. ................. 348/246 |
| 6,611,288 B1 * | | 8/2003 | Fossum et al. .............. 348/246 |
| 6,683,643 B1 * | | 1/2004 | Takayama et al. ........... 348/247 |
| 6,819,358 B1 * | | 11/2004 | Kagle et al. .................. 348/246 |
| 7,092,018 B1 * | | 8/2006 | Watanabe ..................... 348/247 |
| 7,317,481 B2 * | | 1/2008 | Harada et al. ................ 348/243 |
| 7,365,783 B2 * | | 4/2008 | Hashimoto et al. .......... 348/246 |
| 7,411,613 B2 * | | 8/2008 | Honma ..................... 348/222.1 |
| 2003/0151673 A1 * | | 8/2003 | Hashimoto et al. ........ 348/220.1 |
| 2006/0176376 A1 * | | 8/2006 | Dyke et al. ............... 348/222.1 |
| 2008/0094490 A1 * | | 4/2008 | Compton et al. ............ 348/243 |

FOREIGN PATENT DOCUMENTS

JP 03-227185 A 10/1991
JP 10-056596 A 2/1998

* cited by examiner

Primary Examiner—David L Ometz
Assistant Examiner—Trung Diep
(74) Attorney, Agent, or Firm—Canon U.S.A., Inc. I.P. Division

(57) ABSTRACT

An image processing apparatus is configured to include a first storage unit, a second storage unit, and a control unit. The control unit is adapted to perform a control operation to divide, into first data and second data, correction data which is used to correct a defective pixel signal included in an image signal representing one shot image, to transfer the first data from the first storage unit to the second storage unit before starting to shoot an image, and to transfer the second data from the first storage unit to the second storage unit after starting to shoot an image.

12 Claims, 10 Drawing Sheets

IMAGE PROCESSING APPARATUS ADAPTED TO CORRECT IMAGE SIGNAL

BACKGROUND OF THE INVENTION

1. Field of the Invention

The present invention relates to an image processing apparatus, such as a digital camera or a digital video camera, which is adapted to correct an image signal by using data for correction.

2. Description of the Related Art

In recent years, an image processing apparatus, such as a digital camera, using an image pickup device, such as a CCD (charge-coupled device) sensor or a CMOS (complementary metal-oxide semiconductor) sensor, has been used for various purposes. In the process of or after manufacturing an image pickup device, a defect may occur at some pixel thereof. That is, some defective pixel, which outputs a signal having an abnormal signal level, may occur in the image pickup device.

A method of preliminarily storing the address of a defective pixel in an image pickup device and a defect level and an output level at the defective pixel and of correcting image information at the stored address through interpolation with information at surrounding pixels has been proposed as a method of correcting a defective pixel.

This correction method is more specifically described hereinbelow with reference to FIGS. 4A, 9, and 10.

Figure 9:
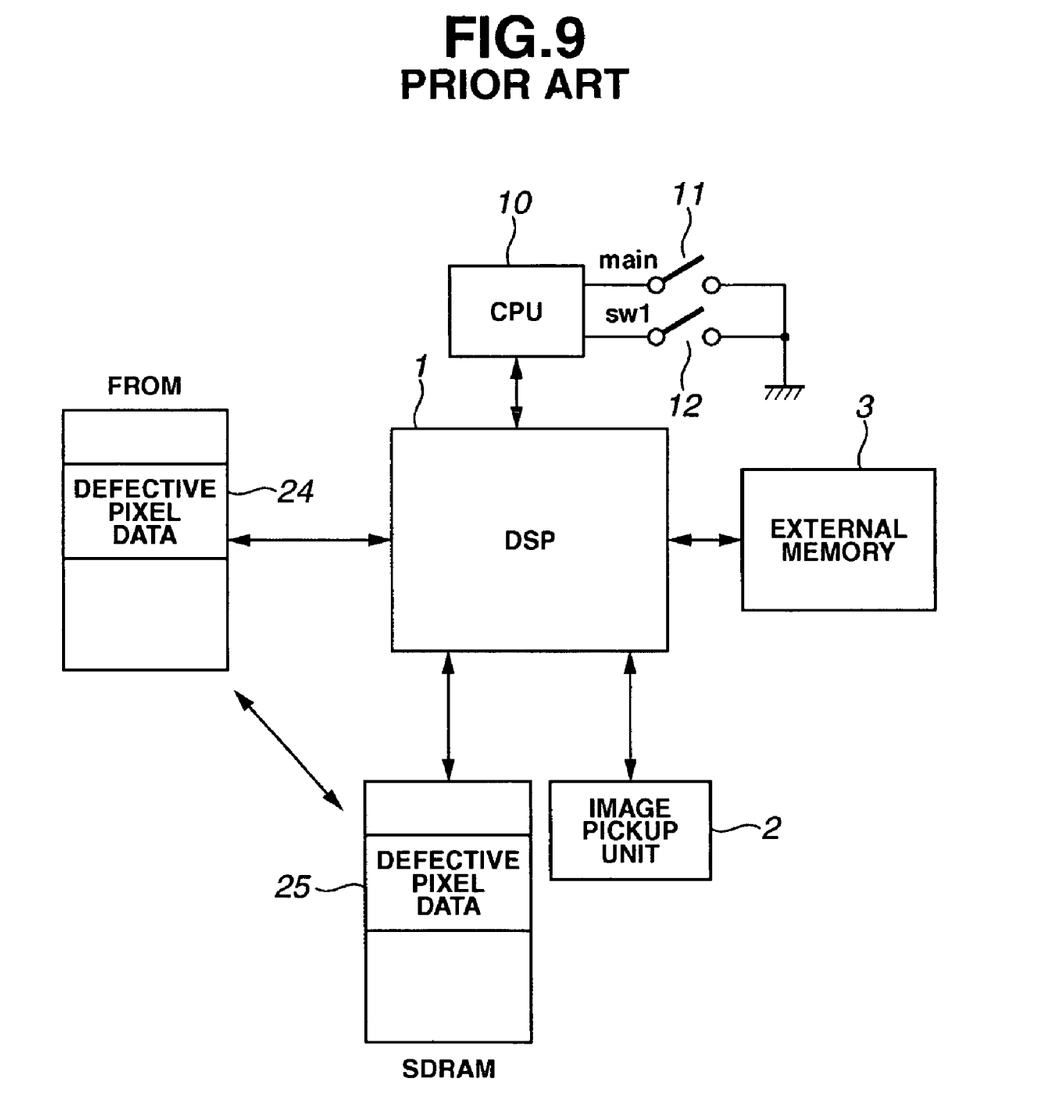
FIG. 9 is a diagram illustrating the configuration of a conventional digital camera.

FIG. 9 is a block diagram showing the configuration of an image processing apparatus, such as a digital camera or a digital video camera.

As shown in FIG. 9, the image processing apparatus includes a digital signal processor (DSP) 1 including an A/D converter configured to perform analog-to-digital (A/D) conversion on a signal output from an image pickup unit 2, a signal processing circuit configured to perform signal processing that includes a signal correction, a circuit configured to control storage operations of various kinds of storage units, a transfer unit configured to transfer data, and a circuit configured to control transfer operations. The image pickup unit 2 includes an image pickup device (not shown), such as a CCD sensor or a CMOS sensor, configured to convert light, which comes from a lens that forms an image of an object, into an electrical signal. An external memory 3 serves as a storage unit that stores a shot image. A flash read-only memory (hereunder abbreviated as FROM) 24 stores control programs and various data used in the image processing apparatus. A synchronous dynamic random access memory (SDRAM) 25 temporarily stores data when the DSP 1 performs signal processing because the SDRAM can be accessed faster than the FROM 24.

A central processing unit (CPU) 10 controls the DSP 1 and also controls components adapted to perform other image processing functions, such as photometering and distance measurement. A main power switch 11 is operable to activate the image processing apparatus. A release switch 12 is operable to start the image processing functions of the image processing apparatus. Each of the switches 11 and 12 is turned on by being shortcircuited to ground (GND).

Figure 10:
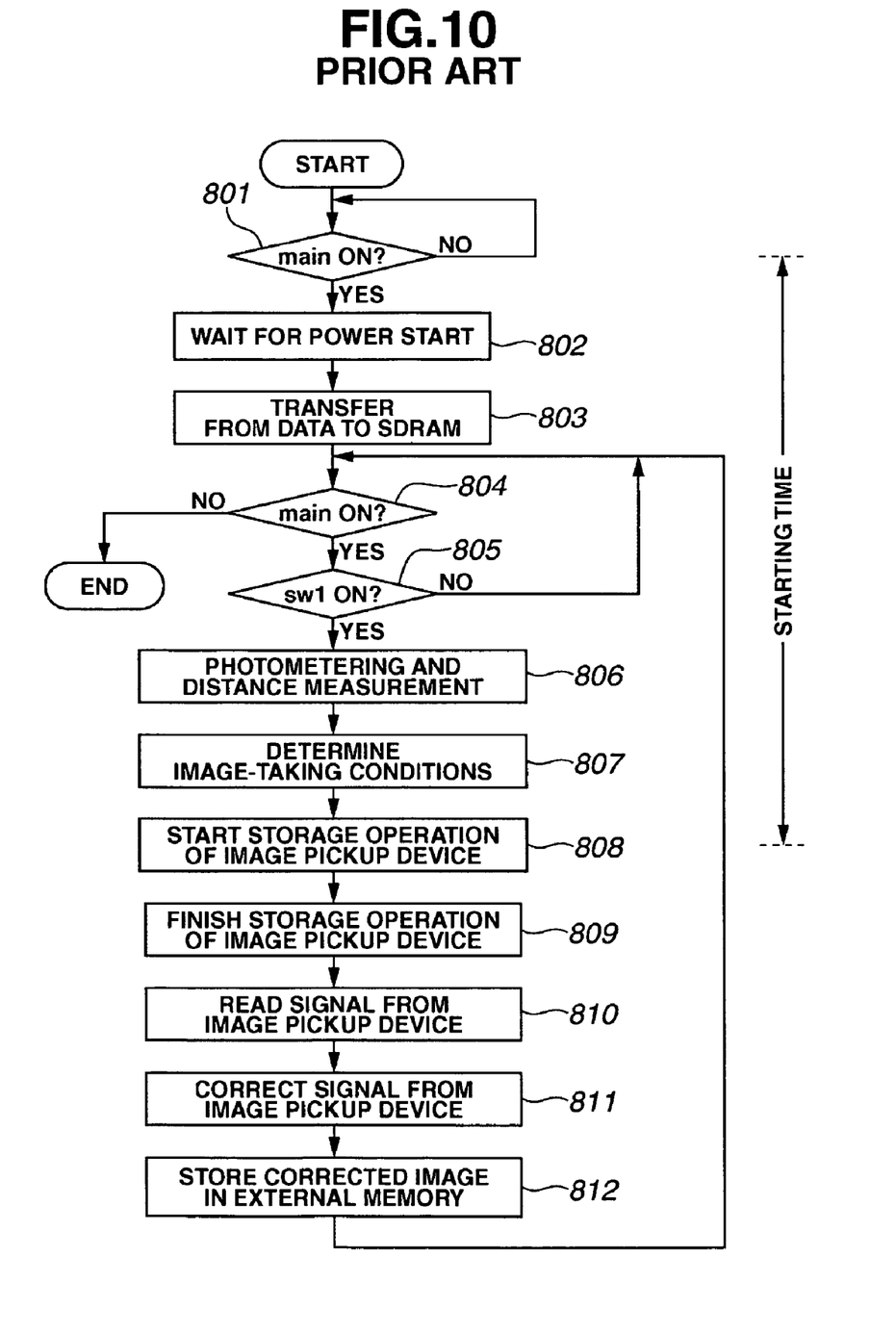
FIG. 10 is a flowchart illustrating an operation of the conventional digital camera.

FIG. 10 is a flowchart illustrating a control operation performed by the CPU 10 in the image processing apparatus shown in FIG. 9. First, it is determined in step 801 whether the main power switch 11, which activates the image processing apparatus, is on. If the power switch 11 is off, step 801 is repeated. On the other hand, if the power switch 11 is on, a power supply (not shown) for the image processing apparatus is activated in step 802. Also, the CPU 10 stands by until the power supply is stabilized. Upon completion of standby until the power supply is stabilized, data, which is obtained by the image pickup device and is stored in the FROM 24, is transferred to the fast accessible SDRAM 25 in step 803. Consequently, preparation is made for fast accesses to the data by the DSP 1 during signal correction.

The data, which is obtained by the image pickup device and is stored in the FROM 24, includes defective pixel information on a defective pixel in the image pickup device. One piece of defective pixel information represents the address and the defect level of one defective pixel. The FROM 24 stores pieces of defective pixel information, the number of pieces of which is equal to that of defective pixels.

In step 804, it is determined again whether the main power switch 11 is on. If the power switch 11 is off, this operation of the image processing apparatus is finished. On the other hand, if the power switch 11 is on, it is determined in step 805 whether the release switch 12 is on. If the release switch 12 is off, processing returns to step 804. On the other hand, if the release switch 12 is on, the photometering and the distance measurement are performed in step 806. Also, if necessary, a shooting lens (not shown) of the image processing apparatus is driven.

According to results of the processing performed in step 806, the CPU 10 determines image-taking conditions, such as the moved position of the shooting lens, a diaphragm value, an accumulation time (storage time) of the image pickup device, and a reading gain at the time of reading of a signal from the image pickup device, in step 807. Then, in step 808, a storage operation of the image pickup device is started.

Assuming that both the power switch 11 and the release switch 12 are simultaneously turned on, a time, which is taken since the power supply of the image processing apparatus is turned on in this state in step 801 until the storage operation of the image pickup device is started in step 808, is defined as a starting time of the image processing apparatus.

Subsequently, in step 809, the storage operation of the image pickup device is stopped after the lapse of the accumulation time (storage time) determined in step 807. Then, in step 810, a signal output from the image pickup device is read in a state in which a gain is set at the reading gain determined in step 807. Upon completion of or while reading a signal output from the image pickup device, the DSP 1 performs various kinds of correction, such as correction of a defective pixel, according to the defective pixel information, which is stored in the SDRAM 25, in step 811.

Subsequently, in step 812, corrected image data is stored in the external memory 3 (hereunder also referred to as a recording medium). Then, processing returns to step 804. Thereafter, processing of steps 804 to 812 is repeated. The corrected image data may be displayed by a display unit (not shown) at that time. Steps 804 to 812 are repeated until it is determined in step 804 that the power switch 11 is off.

Figure 4A:
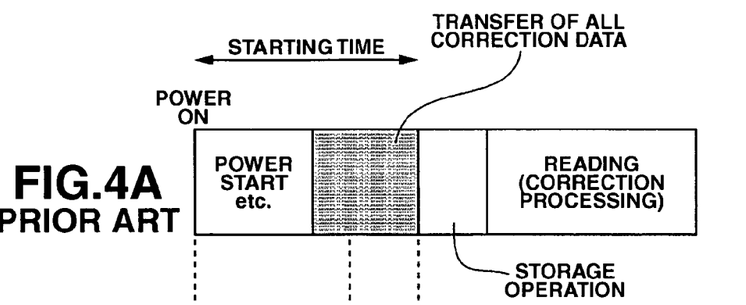
FIGS. 4A to 4C are schematic diagrams illustrating operations of embodiments of the present invention and of a conventional apparatus.

FIG. 4A diagrammatically illustrates the flow from power-on to the reading of signals (including the correction processing thereof), which is shown in FIG. 10 and described above.

After the power supply is turned on, the CPU 10 stands by until the power supply is stabilized. Then, all the data including the defective pixel information, which is stored in the FROM 24, is transferred to the SDRAM 25. Subsequently, the storage operation of the image pickup device is performed. Then, the reading of signals is performed. The starting time of the image processing apparatus is the sum of a time during which the CPU 10 stands by until the power supply is stabilized and a transfer time of all the data (see, for example, Japanese Patent Application Laid-Open No. 3-227185).

However, in recent years, image pickup devices, each of which has a great number of pixels, have been realized. Thus, there is a tendency that the number of defective pixels in an image pickup device increases. Consequently, the number of defective pixels stored in the FROM 24 is enormous. The transfer time of the defective pixel information is unignorably long. Therefore, much time is needed for performing only step 803 shown in FIG. 10. Thus, a photographer may miss a good opportunity for taking a picture of a target scene. Also, when data stored in the FROM 24 is transferred after one picture is taken, a subsequent picture cannot be taken immediately after a first picture. Consequently, a photographer may miss a good opportunity for taking a second picture.

SUMMARY OF THE INVENTION

The present invention has been accomplished in view of the above problems, and is directed to an image processing apparatus in which correction data is divisionally transferred so as to prevent a time required to put the apparatus into a state ready for taking a picture from being extremely long.

The present invention is directed to an image processing apparatus capable of reducing a time required to put the apparatus into a state ready for taking a picture, by divisionally transferring correction data, so that a photographer can take a picture of a target scene without missing a good opportunity for taking a picture of the scene.

According to one aspect of the present invention, an image processing apparatus includes a first storage unit; a second storage unit; and a control unit configured to perform a control operation to divide, into first data and second data, correction data which is used to correct a defective pixel signal included in an image signal representing one shot image, to transfer the first data from the first storage unit to the second storage unit before starting to shoot an image, and to transfer the second data from the first storage unit to the second storage unit after starting to shoot an image.

According to another aspect of the present invention, an image processing apparatus includes a first storage unit; a second storage unit; and a control unit configured to divide, into first data and second data, correction data which is used to correct a defective pixel signal included in an image signal representing one shot image, to transfer the first data from the first storage unit to the second storage unit, to make a determination as to whether to transfer the second data from the first storage unit to the second storage unit, and to control transfer of the second data from the first storage unit to the second storage unit according to the determination.

According to a further aspect of the present invention, an image processing method includes a step of dividing, into first data and second data, correction data which is used to correct a defective pixel signal included in an image signal representing one shot image, a step of transferring the first data from the first storage unit to the second storage unit before starting to shoot an image, and a step of transferring the second data from the first storage unit to the second storage unit after starting to shoot an image.

According to a further aspect of the present invention, an image processing method includes a step of dividing, into first data and second data, correction data which is used to correct a defective pixel signal included in an image signal representing one shot image, a step of transferring the first data from the first storage unit to the second storage unit, a step of making a determination as to whether to transfer the second data from the first storage unit to the second storage unit, and a step of controlling transfer of the second data from the first storage unit to the second storage unit according to the determination.

According to a yet further aspect of the present invention, an information processor executable program includes program code adapted to implement the image processing method.

According to still a further aspect of the present invention, an information processor readable storage medium is adapted to store the program.

Further features of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE EMBODIMENTS

Exemplary embodiments of the invention will be described in detail below with reference to the drawings. However, the dimensions, materials, shapes and relative positions of the constituent parts shown in the embodiments should be changed as convenient depending on various conditions and on the structure of the apparatus adapted to the invention, and the invention is not limited to the embodiments described herein.

First Embodiment

Figure 2:
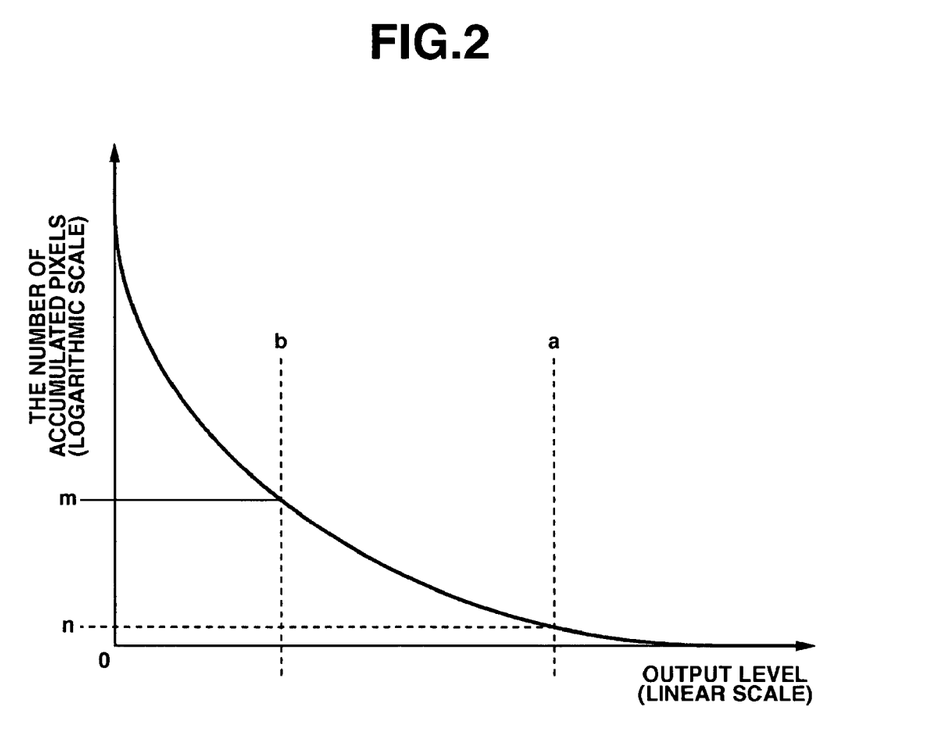
FIG. 2 is a graph illustrating the pixel output characteristic of an image pickup device.

FIG. 2 illustrates an example of the pixel output characteristic of an image pickup device in a case where electric charge is stored for one second in a state in which the image pickup device is shielded from light at room temperature.

In FIG. 2, abscissas designate the output levels of pixels, respectively, on a linear scale. Ordinates designate the numbers of accumulated pixels on a logarithmic scale. The number of accumulated pixels is obtained by accumulation of the frequency of occurrence of pixels, which begins with that of the occurrence of a pixel having the highest output level.

Ideally, when electric charge is stored with the image pickup device shielded from light, the output levels of all of the pixels should be 0. However, actually, there are some pixels the output levels of which are higher than 0. The pixels whose output levels are higher than 0 are defective pixels. The abscissas correspond to the degrees of defect of the defective pixels, respectively. That is, the number of the defective pixels having relatively high output levels is small, while the number of the defective pixels having relatively low output levels is large. The output level of each defective pixel changes depending on ambient temperature and an accumulation time. This is because the defective pixels are attributable to dark current.

Meanwhile, all of the defective pixels do not contribute to deterioration of an image. That is, the defective pixels having high output levels largely contribute to the deterioration of an image, whereas the defective pixels having low output levels hardly contribute to the deterioration of an image.

In view of these facts, in this case, output levels of the defective pixels substantially effectively contributing to the deterioration of an image are set corresponding to the accumulation time. In this graph, a dashed line (a) corresponds to a short accumulation time of about $1/100$ seconds. A dashed line (b) corresponds to a long accumulation time of about 1 second. Pixels having output levels which are higher than that designated by the dashed line are set as defective pixels to be corrected.

That is, the number of defective pixels to be corrected in the case of an accumulation time of $1/100$ seconds is n. The number of defective pixels to be corrected in the case of an accumulation time of 1 second is m.

Meanwhile, it is necessary for correcting the defective pixels to store the addresses and the output levels of the defective pixels to be corrected. However, in a case where the case of a long accumulation time is covered, an amount of information to be stored in the FROM is vast. When all of the data stored in the FROM is transferred to the SDRAM in step 803 described in the description of the related art, the transfer time is unignorable.

The present embodiment is adapted so that only defective pixel information which is necessary in the case of a short accumulation time is transferred from the FROM to the SDRAM at the time of activation of an image processing apparatus such as a digital camera or a digital video camera. Accordingly, an amount of data transferred at the time of activation of the image processing apparatus can considerably be reduced. Consequently, the starting time of the image processing apparatus can be decreased considerably.

Figure 1:
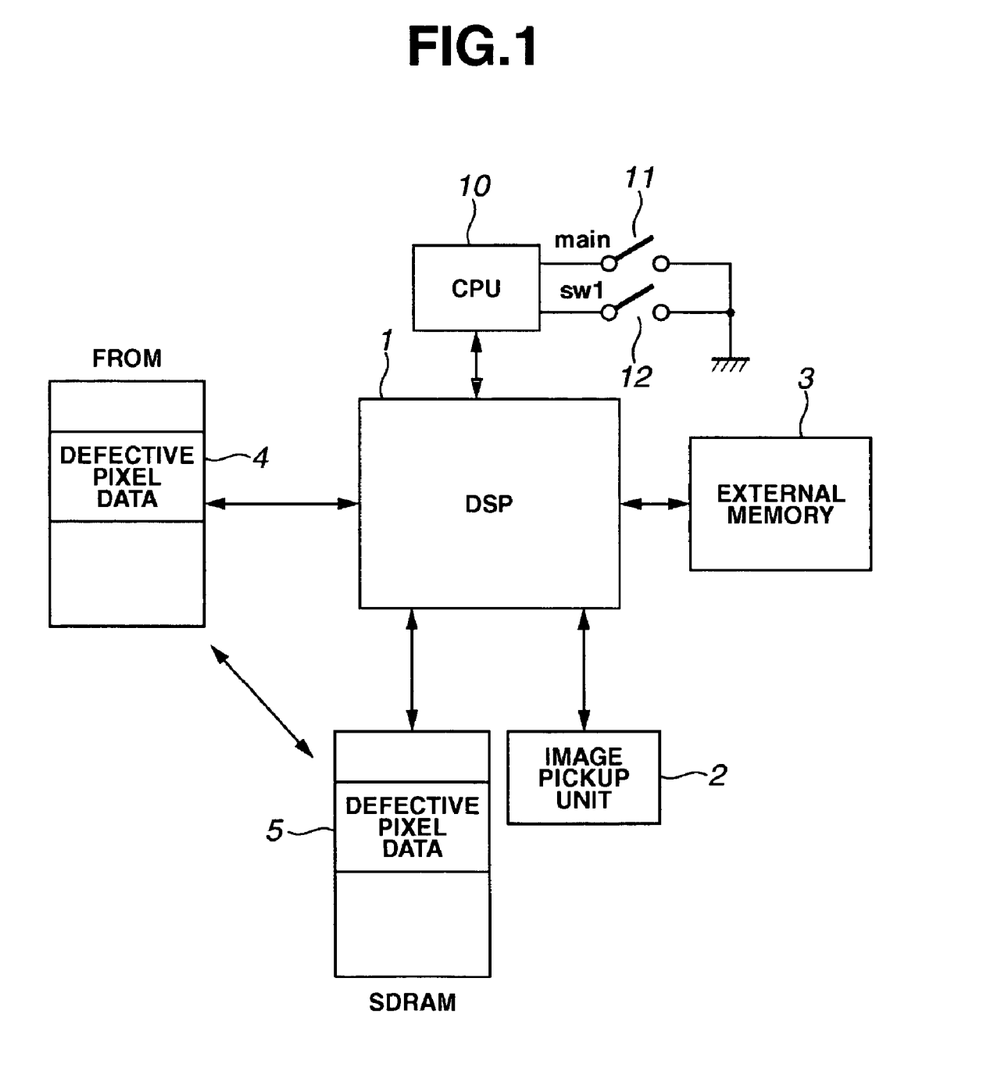
FIG. 1 is a block diagram illustrating the configuration of an image processing apparatus according to an embodiment of the present invention.

FIG. 1 is a diagram illustrating the configuration of an image processing apparatus, such as a digital camera or a digital video camera, according to an exemplary embodiment of the present invention. In FIG. 1, the same reference numerals as in FIG. 9 designate the same components as in the apparatus shown in FIG. 9. Thus, the description of such components is omitted herein. A FROM 4 stores control programs of the image processing apparatus and various data. Defective pixel information to be stored in the FROM 4 includes correction object pixel information in the case of an accumulation time of $1/100$ seconds and correction object pixel information in the case of an accumulation time of 1 second, which are described above with reference to FIG. 2, and which are stored in different regions of the FROM 4, respectively. An SDRAM 5 temporarily holds and stores data when the DSP 1 performs signal processing (data can be read out of the SDRAM 5 at high speed, as compared with the case of reading data from the FROM 4). Similarly, defective pixel information to be stored in the SDRAM 5 includes correction object pixel information in the case of an accumulation time of $1/100$ seconds and correction object pixel information in the case of an accumulation time of 1 second, which are stored in different regions of the SDRAM 5, respectively.

Figure 3:
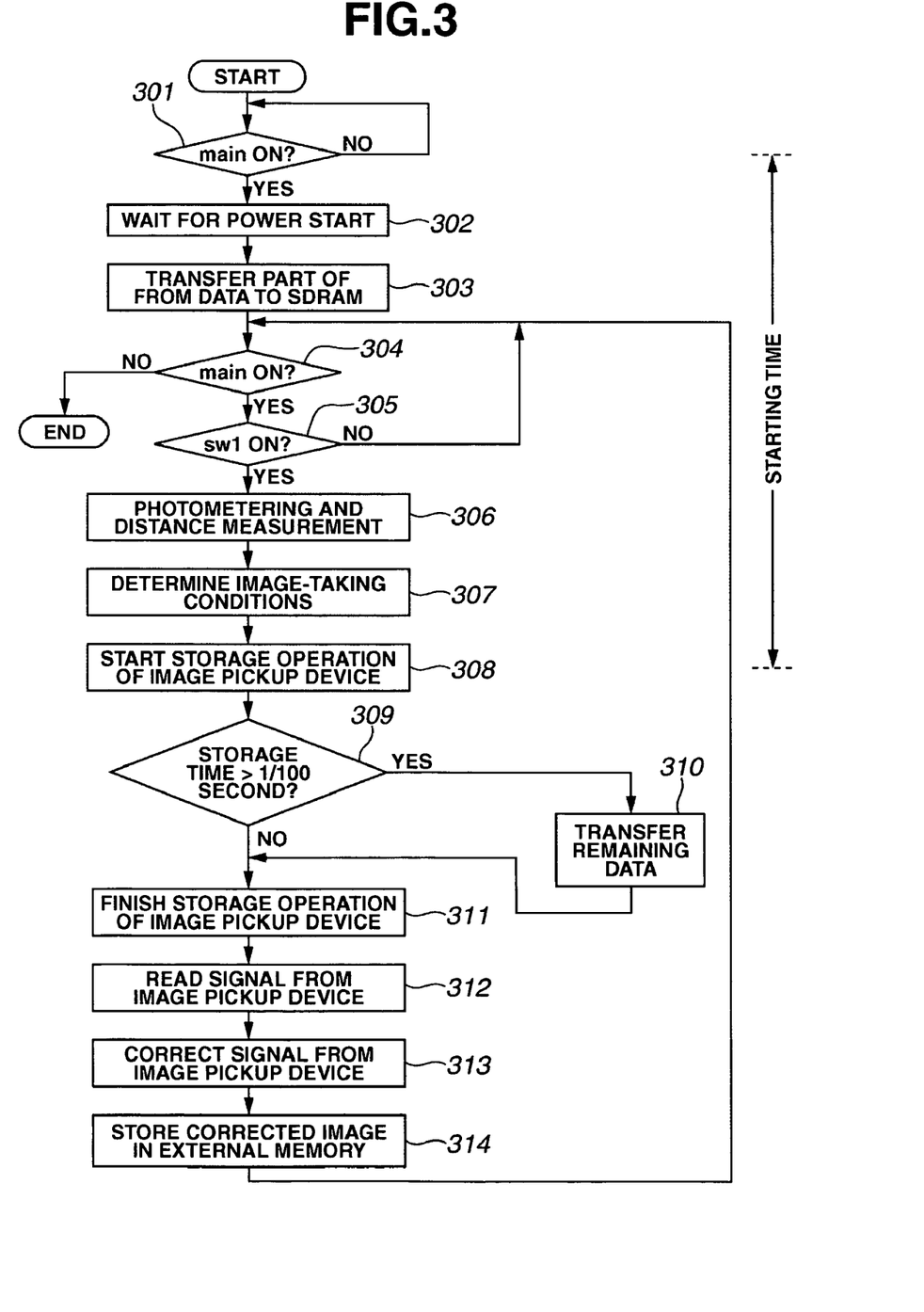
FIG. 3 is a flowchart illustrating a flow of processes including a process of transferring additional data in a case where an accumulation time (storage time) is relatively long.

FIG. 3 is a flowchart illustrating a control operation performed by the CPU 10 in the image processing apparatus according to the first embodiment.

First, it is determined in step 301 whether the main power switch 11, which activates an image pickup system (including the CPU 10) of the image processing apparatus, is on. If the power switch 11 is off, step 301 is repeated. On the other hand, if the power switch 11 is on, a power supply (not shown) for the image processing apparatus is activated in step 302. Also, the CPU 10 stands by until the power supply is stabilized. Upon completion of standby until the power supply is stabilized, data, which is stored in the FROM 4 and is necessary for correction of the image pickup device, is transferred to the fast accessible SDRAM 5 in step 303. In the present embodiment, the correction object pixel information corresponding to n defective pixels in the case of an accumulation time of $1/100$ seconds (that is, in a case where an accumulation time is shorter than a predetermined time) is transferred to the SDRAM 5 as the defective pixel information.

In this step 303, only a part of the defective pixel information stored in the FROM 4 is transferred to the SDRAM 5, instead of transferring all of the defective pixel information stored in the FROM 4 to the SDRAM 5. Thus, the transfer time is negligibly short.

In step 304, it is determined again whether the main power switch 11 is on. If the power switch 11 is off, this operation of the image processing apparatus is finished. On the other hand, if the power switch 11 is on, it is determined in step 305 whether the release switch 12 is on. If the release switch 12 is off, processing returns to step 304. On the other hand, if the release switch 12 is on, photometering and distance measurement are performed in step 306. Also, if necessary, a shooting lens (not shown) of the image processing apparatus is driven.

According to results of the processing performed in step 306, the CPU 10 determines image-taking conditions, such as the moved position of the shooting lens, a diaphragm value, an accumulation time of the image pickup device, and a reading gain at the time of reading of a signal from the image pickup device, in step 307. Then, in step 308, a storage operation of the image pickup device is started.

Subsequently, in step 309, it is determined whether the accumulation time (storage time) included in the determined image-taking conditions is longer than a predetermined time (that is, $1/100$ seconds in the present embodiment). If it is determined that the accumulation time is equal to or shorter than the predetermined time, processing advances to step 311. On the other hand, if it is determined that the accumulation time is longer than the predetermined time, the correction object pixel information corresponding to m defective pixels, which is included in the defective pixel information stored in the FROM 4, in the case of an accumulation time of 1 second is transferred to the SDRAM 5 in step 310.

In step 311, a storage operation of the image pickup device is stopped after the lapse of the accumulation time determined in step 307. Then, in step 312, a signal output from the image pickup device is read in a state in which a gain is set at the reading gain determined in step 307. Upon completion of or while reading a signal output from the image pickup device, the DSP 1 performs various kinds of correction, such as correction of a defective pixel, according to the defective pixel information, which is stored in the SDRAM 5, in step 313. Subsequently, in step 314, the corrected image data is stored in the external memory 3. Then, processing returns to step 304. Thereafter, steps 304 to 314 are repeated until it is determined in step 304 that the power switch 11 is off.

It should be noted that the data transfer in step 310 is performed during the accumulation time of the image pickup device, that the transfer time of all of the data is set to be less than the accumulation time, and that even when a large amount of data is transferred, the transfer time thereof is negligible.

In the present embodiment, the defective pixels represented by the defective pixel information are classified into a group of correction object defective pixels and a group of the other defective pixels according to a classification reference accumulation time. An accumulation time of $1/100$ seconds and an accumulation time of 1 second are employed as the classification reference accumulation time. Further, an accumulation time of $1/100$ seconds is employed as the predetermined time for determining the group of defective pixels, the defective pixel information corresponding to which is transferred. However, the present invention is not limited thereto. The defective pixels can be classified into a larger number of groups. Thus, a larger number of kinds of the predetermined time can be used for determining the group of defective pixels, the defective pixel information corresponding to which is transferred.

Also, in step 310, the data transfer is performed during the accumulation time of the image pickup device. However, in consideration of the influence of noises due to the data transfer upon the image pickup device, the data transfer rate in step 310 is set to be less than the data transfer rate in step 303. Consequently, the influence of noises due to the data transfer can be suppressed.

Even in the case of setting the transfer rate to be less than that in step 303, the transfer time of all of the data is set to be less than the accumulation time. For example, it is assumed that the data transfer rate is 16 MBytes/second, and that the data a total amount of which is 64 kBytes is transferred. Then, the data transfer time required to transfer 64 kBytes is 4 mS (=64000/16000000). That is, in a case where the accumulation time is equal to or longer than 4 mS (for instance, $1/50$ seconds), all of the data can be transferred within the accumulation time. Incidentally, actually, 1 kBytes=1024 Bytes. Thus, it is necessary to take a slight error into consideration. This is represented by the following inequality:

$$T > D/V$$

where V designates a data transfer rate (bytes/second), D denotes the number of bytes of all of the data, and T designates an accumulation time (seconds). The number of bytes of the data varies with individual image processing apparatuses.

Figure 4B:
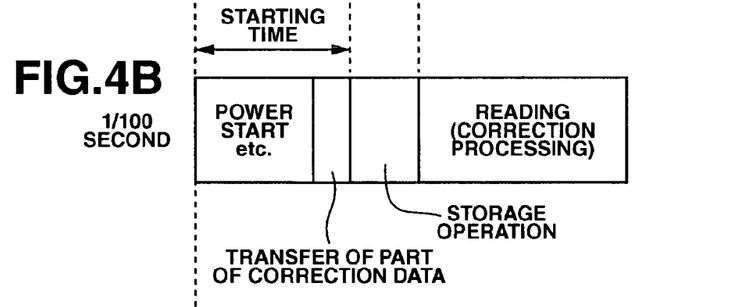
Figure 4C:
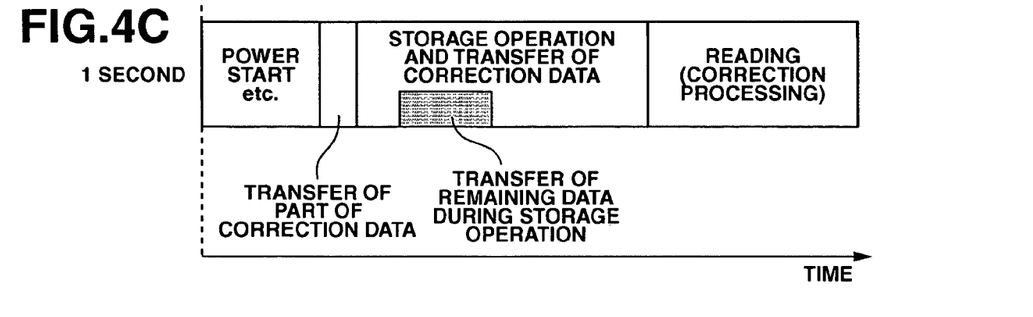

FIGS. 4B and 4C illustrate the flow of the operation, that is, the flow from power-on to the reading of signals (including the correction processing thereof) of the present embodiment illustrated in FIG. 3.

FIG. 4B illustrates the operation in a case where the accumulation time is $1/100$ seconds. That is, after the power supply is turned on, the CPU 10 stands by until the power supply is stabilized. Then, a part of the defective pixel information stored in the FROM 4 is transferred to the SDRAM 5. Thereafter, the storage operation of the image pickup device is performed for a time of $1/100$ seconds. Then, the reading of signals is performed. Thus, the starting time of the image processing apparatus is reduced by an amount of reduction in the data transfer time, as compared with the data transfer time in the case of the conventional apparatus, which is shown in FIG. 4A.

FIG. 4B illustrates the operation in a case where the accumulation time is 1 second. That is, after the power supply is turned on, the CPU 10 stands by until the power supply is stabilized. Then, a part of the defective pixel information stored in the FROM 4 is transferred to the SDRAM 5. Thereafter, the storage operation of the image pickup device is performed for a time of 1 second. During this storage operation, the remaining defective pixel information is transferred from the FROM 4 to the SDRAM 5. Subsequently, the reading of signals is performed. Thus, the starting time of the image processing apparatus is reduced by an amount of reduction in the data transfer time, as compared with the data transfer time in the case of the conventional apparatus, which is shown in FIG. 4A. Also, all of the data including the defective pixel information stored in the FROM 4 can efficiently be transferred to the SDRAM 5.

The present embodiment includes the FROM 4 and the SDRAM 5, which are used to store data that is necessary for correction. Before starting to shoot an image (for example, when the power supply for the image processing apparatus is turned on), minimum necessary data is transferred from the FROM 4 to the SDRAM 5. Thereafter, the remaining data is transferred. Thus, high-precision correction can be achieved, similarly to the conventional apparatus. Also, the present embodiment can considerably reduce a time required until the image processing apparatus is put into a state ready for taking an image. Further, it is determined according to the accumulation time of the image pickup device whether to transfer the remaining data. Additionally, a time required to perform each of operations of the image processing apparatus can efficiently be reduced.

Also, a part of the data stored in the memory is set to be needed only when the accumulation time of the image pickup device is short. Thus, sufficient correction can be performed in the case where the accumulation time is short. Also, a comparison is performed to determine whether the accumulation time is longer than the predetermined time. If the accumulation time is longer than the predetermined time, the remaining data is transferred during the storage operation. Accordingly, sufficient correction can be performed even in the case where the accumulation time is long. Also, the transfer is performed in parallel with the storage operation. Consequently, a time unnecessarily taken to transfer the data can be saved.

Further, in the case of transferring the remaining data, in view of the influence of noises due to the data transfer, the transfer rate, at which the transfer of data is performed during the storage operation of the image pickup apparatus, is set to be less than the transfer rate, at which the minimum necessary data is transferred with predetermined timing, for example, when the power supply for the image processing apparatus is activated before starting to shoot an image.

Second Embodiment

The configuration of an image processing apparatus, such as a digital camera or a digital video camera, according to a second embodiment is similar to that shown in FIG. 1. Therefore, the description of constituent elements of the second embodiment is not repeated here.

Figure 5:
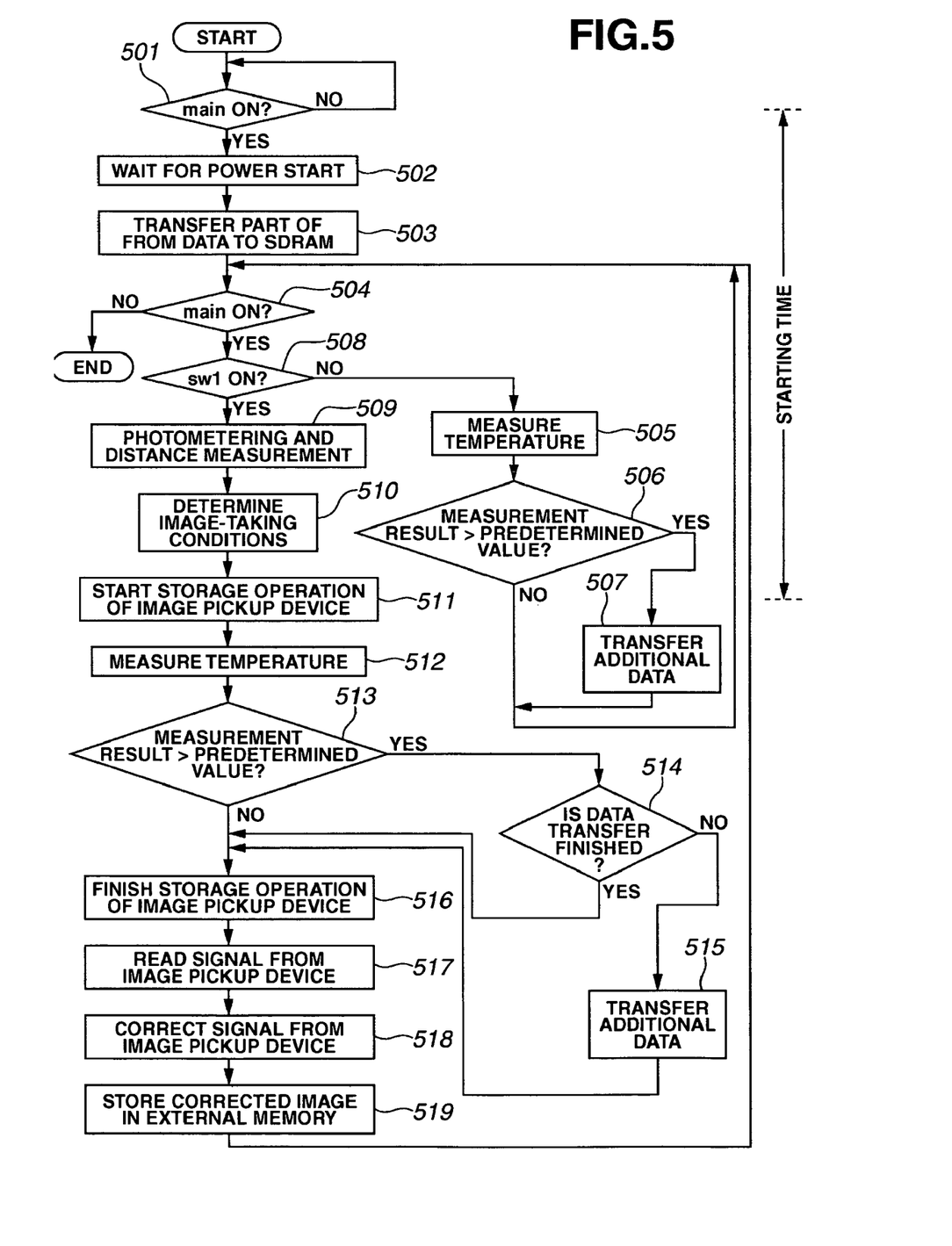
FIG. 5 is a flowchart illustrating a flow of processes including a process of transferring additional data according to a change in temperature of an image pickup device according to a second embodiment of the present invention.

FIG. 5 is a flowchart illustrating a control operation performed by the CPU 10 in the image processing apparatus according to the second embodiment, which is shown in FIG. 1. First, it is determined in step 501 whether the main power switch 11, which activates an image pickup system of the image processing apparatus, is on. If the power switch 11 is off, step 501 is repeated. On the other hand, if the power switch 11 is on, a power supply (not shown) for the image processing apparatus is activated in step 502. Also, the CPU 10 stands by until the power supply is stabilized. Upon completion of standby until the power supply is stabilized, data, which is stored in the FROM 4 and is necessary for correction of the image pickup device, is transferred to the fast accessible SDRAM 5 in step 503. In the second embodiment, the correction object pixel information corresponding to n defective pixels in the case of an accumulation time of $1/100$ seconds is transferred to the SDRAM 5 as the defective pixel information.

In this step 503, only a part of the defective pixel information stored in the FROM 4 is transferred to the SDRAM 5, instead of transferring all of the defective pixel information stored in the FROM 4 to the SDRAM 5. Thus, the transfer time is negligibly short.

In step 504, it is determined again whether the main power switch 11 is on. If the power switch 11 is off, this operation of the image processing apparatus is finished.

On the other hand, if it is determined in step 504 that the power switch 11 is on, in step 508, it is determined whether the release switch 12 is on. If the release switch 12 is off, the processing advances to step 505. In step 505, the temperature of the image pickup device is measured by using a thermometer (not shown). Thus, the temperature employed as the image-taking condition is detected. Then, in step 506, it is determined whether the temperature measured in step 505 is higher than a predetermined value. If the temperature measured in step 505 is not higher than the predetermined value, processing returns to step 504. On the other hand, if the temperature measured in step 505 is higher than the predetermined value, defective pixel data corresponding to the measured temperature is transferred to the SDRAM 5 in step 507. Subsequently, processing returns to step 504. Thus, the data is transferred while the apparatus is in a non-operation condition in which the release switch 12 is not turned on yet and in which the apparatus is ready for taking an image. Consequently, a time required until the image processing apparatus is put into a state ready for taking an image can be reduced.

If it is determined in step 508 that the release switch 12 is on, photometering and distance measurement are performed in step 509. Also, if necessary, a shooting lens (not shown) of the image processing apparatus is driven. According to results of the processing performed in step 509, the CPU 10 determines image-taking conditions, such as the moved position of the shooting lens, a diaphragm value, an accumulation time of the image pickup device, and a reading gain at the time of reading of a signal from the image pickup device, in step 510. Then, in step 511, a storage operation of the image pickup device is started.

Subsequently, in step 512, the temperature of the image pickup device is measured by a thermometer (not shown), so that the temperature employed as the image-taking condition is detected. Then, in step 513, it is determined whether the temperature measured in step 512 is higher than a predetermined value. If the temperature measured in step 512 is not higher than the predetermined value, processing advances to step 516. On the other hand, if the temperature measured in step 512 is higher than the predetermined value, it is determined in step 514 whether defective pixel data corresponding to the measured temperature is already transferred to the SDRAM 5. If the transfer of the defective pixel data corresponding to the measured temperature is not completed, the defective pixel data corresponding to the measured temperature is transferred to the SDRAM 5 in step 515 and processing then proceeds to step 516. On the other hand, if the defective pixel data corresponding to the measured temperature is already transferred to the SDRAM 5, processing proceeds to step 516.

In step 516, the storage operation of the image pickup device is stopped after the lapse of the accumulation time determined in step 510. Then, in step 517, a signal output from the image pickup device is read in a state in which a gain is set at the reading gain determined in step 510. Upon completion of or while reading a signal output from the image pickup device, the DSP 1 performs various kinds of correction, such as correction of a defective pixel, according to the defective pixel information, which is stored in the SDRAM 5, in step 518. Subsequently, in step 519, the corrected image data is stored in the external memory 3. Then, processing returns to step 504. Thereafter, steps 504 to 519 are repeated until it is determined in step 504 that the main power switch 11 is off.

As described above, the second embodiment is adapted so that the minimum necessary data is transferred to the SDRAM 5, and that the transfer of the remaining data is started after the apparatus starts to shoot an image. Thus, high-precision correction can be achieved, similarly to the conventional apparatus. Also, the second embodiment can considerably reduce a time required until the image processing apparatus is put into a state ready for taking an image.

The higher the temperature is, the more correction of the defective pixels is needed. Thus, it is effective to determine according to the temperature whether to transfer additional data.

The transfer of the additional defective pixel data is performed in step 507 or 515 in the second embodiment. However, in a case where the transfer of the additional defective pixel data is not completed in step 507 or 515, the remaining data may be thereafter transferred in a time (for example, between steps 516 and 517) other than an image signal reading time. Thus, the transfer of the data can efficiently be achieved by dividing the data into a plurality of parts and transferring the plurality of parts separately from one another.

Third Embodiment

The configuration of an image processing apparatus, such as a digital camera or a digital video camera, according to a third embodiment is similar to that shown in FIG. 1. Therefore, the description of constituent elements of the third embodiment is not repeated here.

Figure 6:
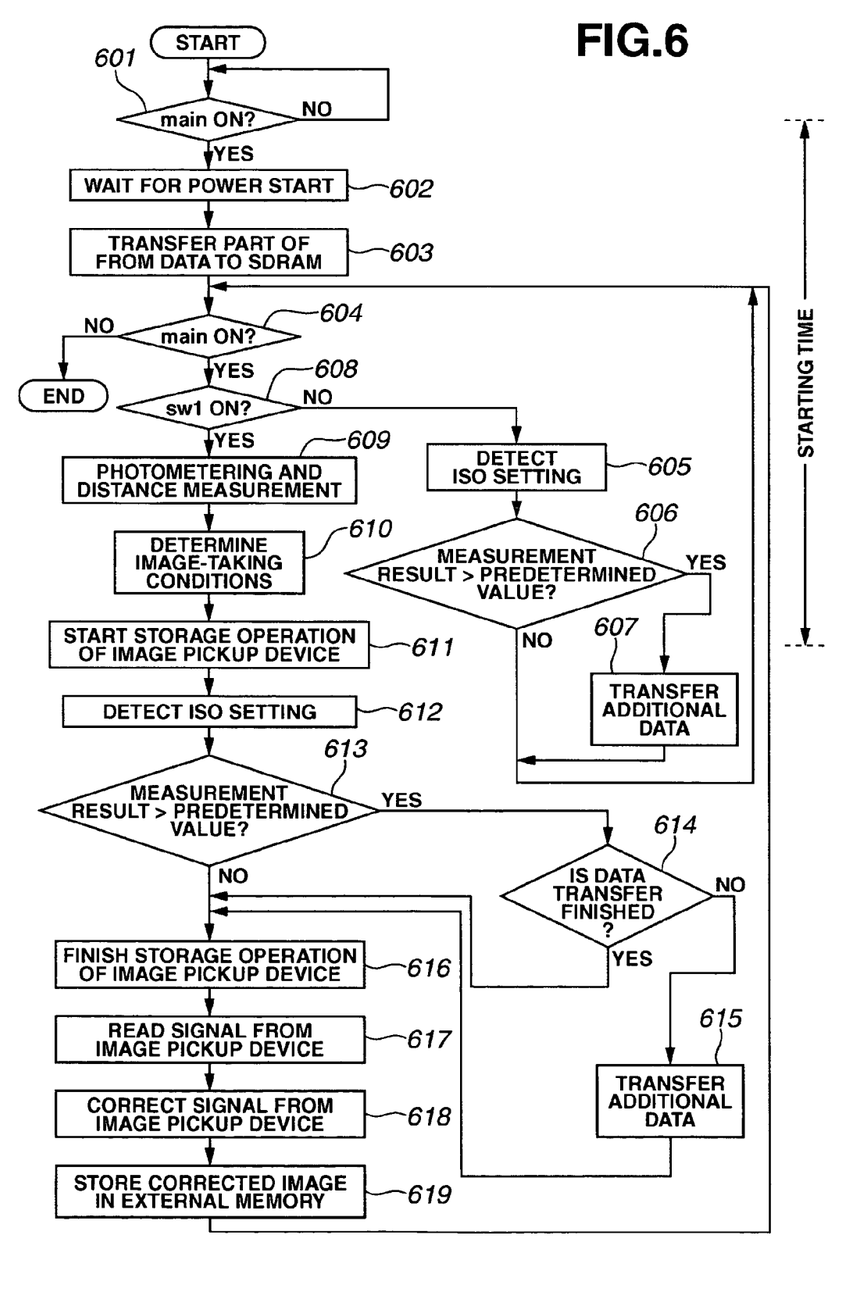
FIG. 6 is a flowchart illustrating a flow of processes including a process of transferring additional data according to ISO sensitivity set in an image processing apparatus according to a third embodiment of the present invention.

FIG. 6 is a flowchart illustrating a control operation performed by the CPU 10 in the image processing apparatus according to the third embodiment, which is shown in FIG. 1. First, it is determined in step 601 whether the main power switch 11, which activates an image pickup system of the image processing apparatus, is on. If the power switch 11 is off, step 601 is repeated. On the other hand, if the power switch 11 is on, a power supply (not shown) for the image processing apparatus is activated in step 602. Also, the CPU 10 stands by until the power supply is stabilized. Upon completion of standby until the power supply is stabilized, data, which is stored in the FROM 4 and is necessary for correction of the image pickup device, is transferred to the fast accessible SDRAM 5 in step 603. In the third embodiment, the correction object pixel information corresponding to n defective pixels in the case of an accumulation time of 1/100 seconds is transferred to the SDRAM 5 as the defective pixel information.

In this step 603, only a part of the defective pixel information stored in the FROM 4 is transferred to the SDRAM 5, instead of transferring all of the defective pixel information stored in the FROM 4 to the SDRAM 5. Thus, the transfer time is negligibly short.

In step 604, it is determined again whether the main power switch 11 is on. If the power switch 11 is off, this operation of the image processing apparatus is finished.

On the other hand, if it is determined in step 604 that the power switch 11 is on, processing moves to step 608. In step 608, it is determined whether the release switch 12 is on. If the release switch 12 is off, processing advances to step 605. In step 605, the ISO sensitivity employed as the image-taking condition is detected. Then, in step 606, it is determined whether the ISO sensitivity detected in step 605 is higher than a predetermined value. If the ISO sensitivity detected in step 605 is higher than the predetermined value, defective pixel data corresponding to the detected ISO sensitivity is transferred to the SDRAM 5 in step 607. Then, processing returns to step 604. On the other hand, if the ISO sensitivity detected in step 605 is not higher than the predetermined value, processing returns to step 604.

If it is determined in step 608 that the release switch 12 is on, photometering and distance measurement are performed in step 609. Also, if necessary, a shooting lens (not shown) of the image processing apparatus is driven.

According to results of the processing performed in step 609, the CPU 10 determines image-taking conditions, such as the moved position of the shooting lens, a diaphragm value, an accumulation time of the image pickup device, and a reading gain at the time of reading of a signal from the image pickup device, in step 610. Then, in step 611, a storage operation of the image pickup device is started.

Subsequently, in step 612, the ISO sensitivity employed as the image-taking condition is detected. Then, in step 613, it is determined whether the ISO sensitivity detected in step 612 is higher than a predetermined value. If the ISO sensitivity detected in step 612 is not higher than the predetermined value, processing advances to step 616. On the other hand, if the ISO sensitivity detected in step 612 is higher than the predetermined value, it is determined in step 614 whether defective pixel data corresponding to the detected ISO sensitivity is already transferred to the SDRAM 5. If the transfer of the defective pixel data corresponding to the detected ISO sensitivity is not completed, the defective pixel data corresponding to the detected ISO sensitivity is transferred to the SDRAM 5 in step 615 and processing proceeds to step 616. On the other hand, if it is determined in step 614 that the defective pixel data corresponding to the detected ISO sensitivity is already transferred to the SDRAM 5, processing proceeds to step 616.

In step 616, the storage operation of the image pickup device is stopped after the lapse of the accumulation time determined in step 610. Then, in step 617, a signal output from the image pickup device is read in a state in which a gain is set at the reading gain determined in step 610. Upon completion of or while reading a signal output from the image pickup device, the DSP 1 performs various kinds of correction, such as correction of a defective pixel, according to the defective pixel information, which is stored in the SDRAM 5, in step 618. Subsequently, in step 619, the corrected image data is stored in the external memory 3. Then, processing returns to step 604. Thereafter, processing of steps 604 to 619 is repeated until it is determined in step 604 that the main power switch 111 is off.

The third embodiment is adapted so that the minimum necessary data is transferred to the SDRAM 5, and that the transfer of the remaining data is started after the apparatus starts to shoot an image. Thus, high-precision correction can be achieved, similarly to the conventional apparatus. Also, the third embodiment can considerably reduce a time required until the image processing apparatus is put into a state ready for taking an image.

The higher the ISO sensitivity is, the more correction of the defective pixels is needed. Thus, it is effective to determine according to the set ISO sensitivity whether to transfer additional data.

The transfer of the additional defective pixel data is performed in step 607 or 615 in the third embodiment. However, in a case where the transfer of the additional defective pixel is not completed in step 607 or 615, the remaining data may be thereafter transferred in a time (for example, between steps 616 and 617) other than an image signal reading time. Thus, the transfer of the data can efficiently be achieved by dividing the data into a plurality of parts and transferring the plurality of parts separately from one another.

Additionally, in the foregoing description of the first to third embodiments, the accumulation time, the temperature and the ISO sensitivity of the image pickup device have been cited as the image-taking conditions. Also, the operations at the time of a change in such conditions have been described. However, the timing with which the data is transferred may be controlled according to some combination of such conditions.

Fourth Embodiment

The configuration of an image processing apparatus, such as a digital camera or a digital video camera, according to a fourth embodiment is similar to that shown in FIG. 1. Therefore, the description of constituent elements of the fourth embodiment is not repeated here.

Figure 7:
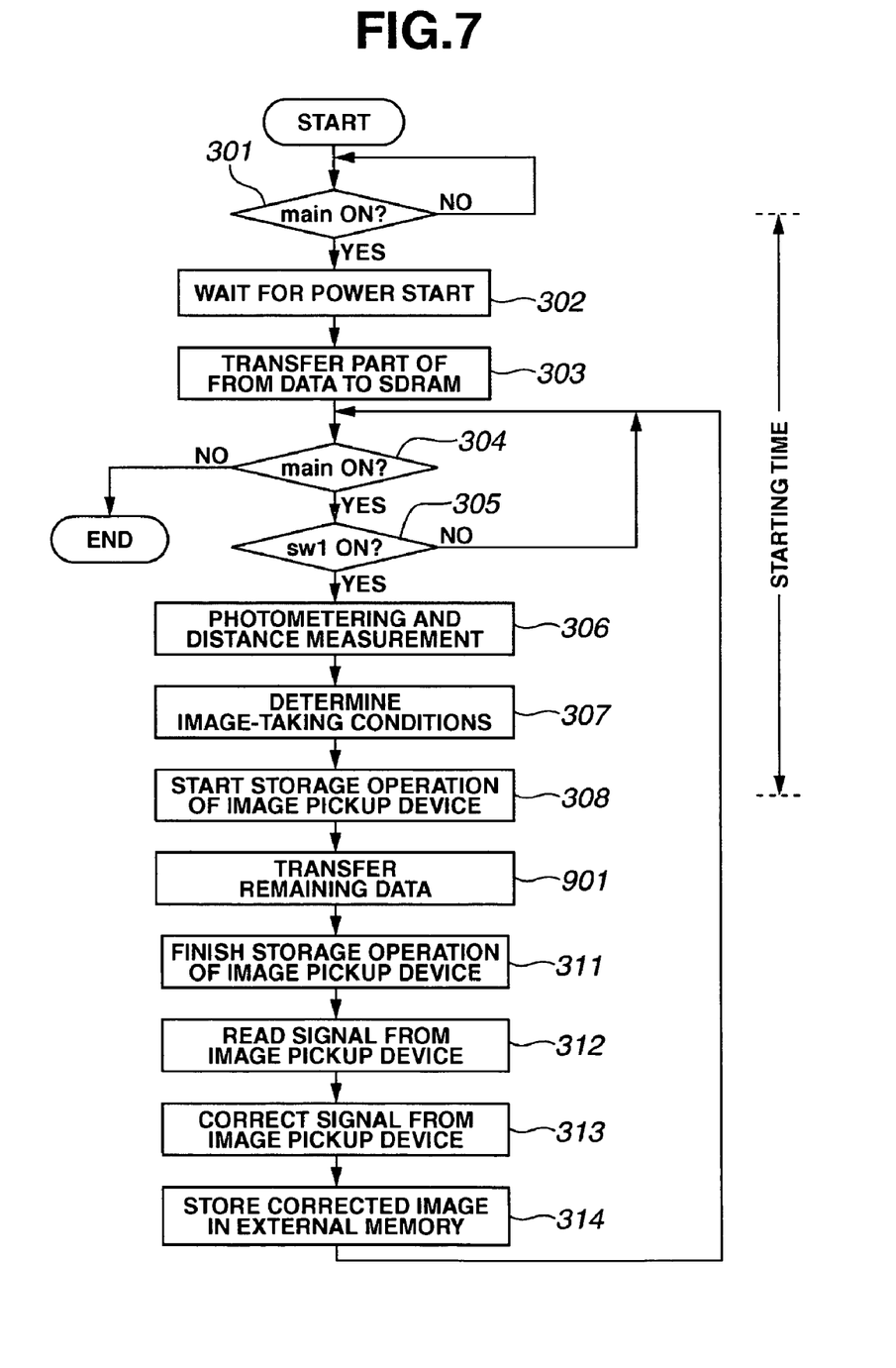
FIG. 7 is a flowchart illustrating a control operation by a CPU provided in the image processing apparatus shown in FIG. 1 according to a fourth embodiment of the present invention.

FIG. 7 is a flowchart illustrating a control operation performed by the CPU 10 in the image processing apparatus according to the fourth embodiment, which is shown in FIG. 1.

Hereinafter, an operation of the fourth embodiment, which differs from the operation of the first embodiment, is described. Although the first embodiment is adapted so that only in a case where the accumulation time is longer than 1/100 seconds, the remaining data is transferred during the accumulation time after the apparatus starts to shoot an image, the fourth embodiment is adapted so that the remaining data is always transferred in step 901 during the accumulation time after the apparatus starts to shoot an image.

In the fourth embodiment, in a case where the accumulation time is quite short, when all of the remaining data is not transferred even after the storage operation of the image pickup device is finished, the reading of a signal from the image pickup device is started upon completion of the transfer.

In the fourth embodiment, all of the correction object pixel information is transferred regardless of the image-taking conditions. However, according to the fourth embodiment, the correction object pixel information is divided into two parts. The two parts are respectively transferred before and after the image-taking conditions are determined. Thus, the fourth embodiment can reduce a time required until the apparatus is put into a state ready for taking an image.

In addition, the fourth embodiment is adapted so that the transfer of minimum necessary data is started when the power supply for an image pickup system of the image processing apparatus is started. However, the transfer of minimum necessary data may be started at any moment before the apparatus starts to shoot an image.

Also, the fourth embodiment is adapted so that additional data is transferred during an exposure period of time. However, the additional data can be transferred in a period of time other than a time in which an image signal is output from the image pickup device, so as to prevent noises from affecting an image.

Fifth Embodiment

The configuration of an image processing apparatus, such as a digital camera or a digital video camera, according to a fifth embodiment is similar to that shown in FIG. 1. Therefore, the description of constituent elements of the fifth embodiment is not repeated here.

Figure 8:
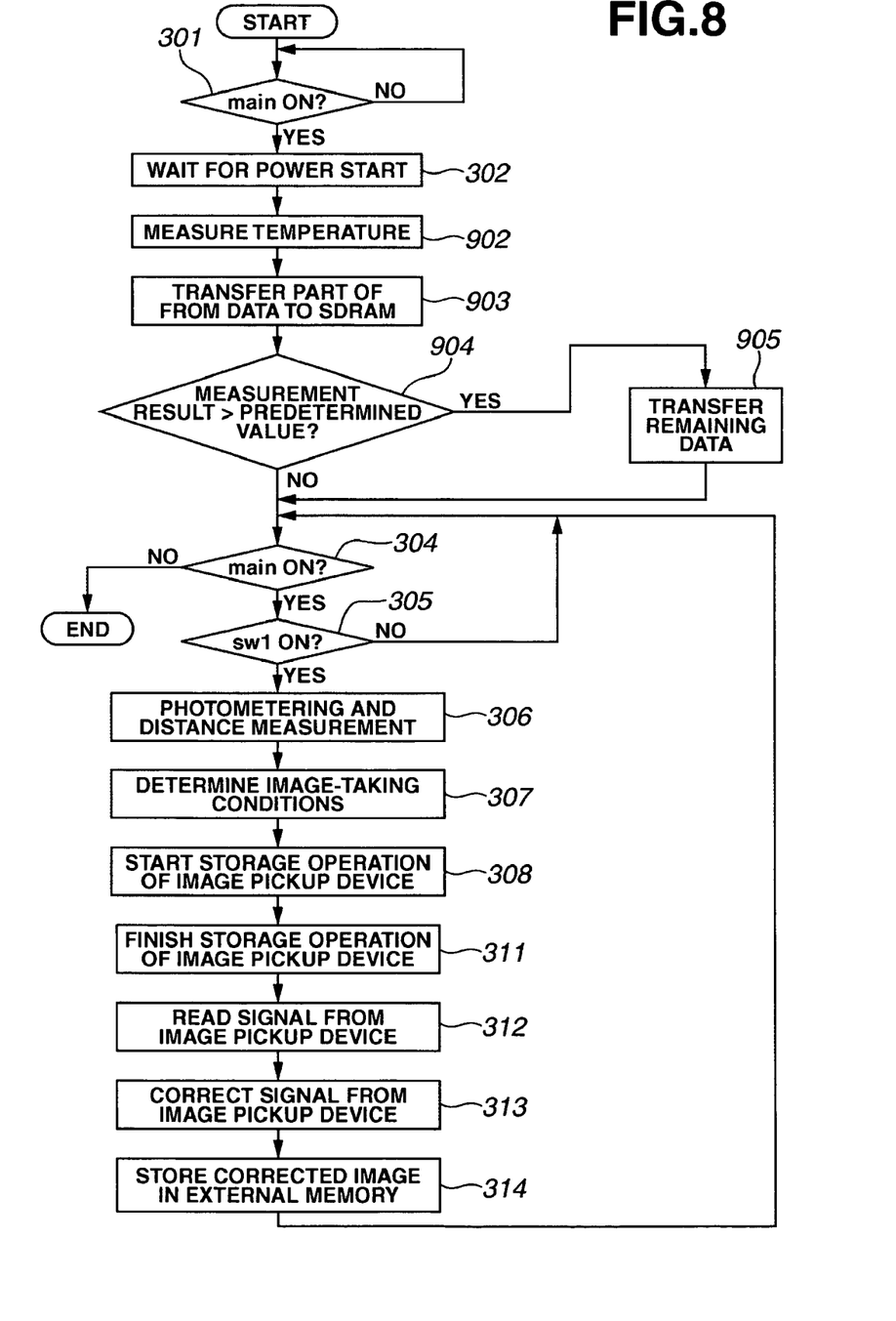
FIG. 8 is a flowchart illustrating a control operation by a CPU provided in the image processing apparatus shown in FIG. 1 according to a fifth embodiment of the present invention.

FIG. 8 is a flowchart illustrating a control operation performed by the CPU 10 in the image processing apparatus according to the fifth embodiment, which is shown in FIG. 1.

Hereinafter, an operation of the fifth embodiment, which differs from the operation of the second embodiment, is described. The second embodiment is adapted so that additional data is transferred only in a case where the release switch 12 is not pushed and where the measured temperature is higher than the predetermined value, and so that the additional data is transferred only in a case where the temperature which is measured during the accumulation time after the apparatus starts to shoot an image is higher than the predetermined value and where the transfer of the additional data is not completed. In contrast, according to the fifth embodiment, temperature is measured immediately after the power supply is activated before the image-taking conditions are determined. The fifth embodiment is adapted so that additional data is transferred only in a case where the measured temperature is higher than a predetermined value (steps 902 to 905).

Thereafter, the fifth embodiment does not perform the measurement of temperature and the transfer of the additional data according to the result of the measurement.

According to the fifth embodiment, in a case where the measured temperature is higher than the predetermined value, it takes time to bring the apparatus into a state ready for taking an image (that is, the starting time is relatively long). However, in a case where the measured temperature is lower than the predetermined value, the fifth embodiment can reduce a time required to bring the apparatus into a state ready for taking an image, similarly to the first to third embodiments.

Although in the foregoing description of the fifth embodiment, the operation in steps 902 to 905 is performed immediately after the power supply is turned on, the operation in steps 902 to 905 may be performed between steps 312 and 313.

In the case of this operation, because correction cannot be performed just after a signal from the image pickup device is read, it takes time to put, after taking an image, the apparatus into a state ready for taking the next image. However, in a case where the measured temperature is lower than a predetermined value, only a part of the data is transferred. Thus, as compared with the apparatus adapted so that all of the data is always transferred, the fifth embodiment can reduce a time required to put, after taking an image, the apparatus into a state ready for taking the next image.

Although in the fifth embodiment it is determined according to the temperature condition employed as the image-taking condition whether to transfer the remaining data, the image processing apparatus may perform the determination of the transfer of the remaining data in response to a photographer's operation performed on an operation button for inputting an instruction to transfer the remaining data, instead of the image-taking conditions.

Additionally, each of the first to third embodiments is adapted so that the data is divided into parts and then the parts are transferred separately from one another according to the image-taking conditions, such as the accumulation time, the temperature and the ISO sensitivity of the image pickup device. However, the defective pixel data may be classified into partial data corresponding to singly present defective pixels, and partial data corresponding to continuously present defective pixels, so that these partial data are transferred separately from each other.

Although each of the first to fifth embodiments is configured to have a single ROM and a single RAM, the image processing apparatus of the invention may be configured to have a plurality of ROMs and a plurality of RAMs and may be adapted so that the data is divided into parts which are respectively stored in the plurality of ROMs and the plurality of RAMs.

Other Embodiments

The present invention may be applied to a system which includes a plurality of apparatuses, and to a system constituted by a single apparatus.

The present invention includes an apparatus and a method practiced by supplying software (program code), which is configured to operate various kinds of devices so as to implement the functions of the aforementioned embodiments, to a computer (CPU or micro-processing unit (MPU)) in an apparatus or system, which is connected to the various devices, from a storage medium or via a transmission medium such as the Internet, and by causing the devices to operate according to the software (program code) stored in the computer.

In this case, the program code itself read from the storage medium implements the functions of the aforementioned embodiments. For example, a flexible disk, a hard disk, an optical disk, a magneto-optical disk, a compact disc—read-only memory (CD-ROM), a compact disc—recordable (CD-R), a magnetic tape, a nonvolatile memory card, or a read-only memory (ROM) may be used as the storage medium for storing the program code.

Further, the functions of the aforementioned embodiments are implemented not only by executing the supplied program code in the computer but by performing processing according to an OS (Operating System), which runs on the computer in cooperation with other application software. In these cases, the program code itself is included in the aforementioned embodiments.

Furthermore, the functions of the aforementioned embodiments are also implemented by performing part or all of actual processing through the use of a CPU or the like, which is provided in a function expansion board inserted into the computer or in a function expansion unit connected to the computer, according to instructions issued by the program code after being stored in a memory provided on the function expansion board or on the function expansion unit.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Applications No. 2004-315841 filed Oct. 29, 2004, No. 2005-025212 filed Feb. 1, 2005, and No. 2005-025213 filed Feb. 1, 2005, which are hereby incorporated by reference herein in their entirety.

What is claimed is:

1. An image processing apparatus comprising:
    an image pickup unit configured to pick up an object image and to generate an image signal;
    a correction unit configured to perform a predetermined correction on the image signal;
    a first storage unit configured to store first correction data corresponding to a first image pickup condition and second correction data corresponding to a second image pickup condition;
    a second storage unit which is different from the first storage unit; and
    a control unit configured to transfer the first correction data from the first storage unit to the second storage unit before starting a charge accumulation of the image pickup unit, to transfer the second correction data from the first storage unit to the second storage unit during the charge accumulation, and to control the correction unit to perform the predetermined correction on the image signal based on the first correction data or the second correction data after finishing the charge accumulation.

2. The image processing apparatus according to claim 1, wherein the control unit is configured to transfer the first correction data from the first storage unit to the second storage unit when a power supply is turned on.

3. The image processing apparatus according to claim 1, wherein the control unit is configured to transfer the second correction data from the first storage unit to the second storage unit in a period of time other than a period of time in which the image signal is output from the image pickup unit.

4. The image processing apparatus according to claim 1, wherein the control unit is configured to control a transfer rate at which the second correction data is transferred to be less than a transfer rate at which the first correction data is transferred.

5. The image processing apparatus according to claim 1, wherein the predetermined correction performed by the correction unit is to correct a defective pixel signal included in an image signal representing one shot image, by using the data transferred to the second storage unit.

6. The image processing apparatus according to claim 1, further comprising:
    an analog-to-digital converter configured to perform analog-to-digital conversion on an image signal output from the image pickup unit.

7. The image processing apparatus according to claim 1, wherein a data reading rate of the first storage unit is less than that of the second storage unit.

8. The image processing apparatus according to claim 1, wherein the control unit is configured to make a determination as to whether to transfer the second correction data from the first storage unit to the second storage unit, and to control transfer of the second correction data from the first storage unit to the second storage unit according to the determination.

9. The image processing apparatus according to claim 8, wherein the control unit is configured to make the determination, according to an image pickup condition, whether to transfer the second correction data from the first storage unit to the second storage unit.

10. The image processing apparatus according to claim 9, wherein the image pickup condition includes at least one of an accumulation time, a temperature, and an ISO sensitivity of the image pickup unit.

11. The image processing apparatus according to claim 1, the correction unit is configured to correct a defective pixel included in the image signal.

12. An image processing method for controlling an image processing apparatus including an image pickup unit, a correction unit, a first storage unit and a second storage unit which is different from the first storage unit, the image processing method comprising:
    picking up an object image, by the image pickup unit;
    generating an image signal, by the image pickup unit;
    performing predetermined correction, by the correction unit, on the image signal;
    storing, in the first storage unit, first correction data corresponding to a first image pickup condition and second correction data corresponding to a second image pickup condition;
    transferring the first correction data from the first storage unit to the second storage unit before starting a charge accumulation of the image pickup unit; and
    transferring the second correction data from the first storage unit to the second storage unit during the charge accumulation.

* * * * *